(12) United States Patent
Chun

(10) Patent No.: US 11,609,164 B2
(45) Date of Patent: Mar. 21, 2023

(54) THERMAL DESORBERS

(71) Applicant: Hamilton Sundstrand Corporation, Charlotte, NC (US)

(72) Inventor: Richard K. Chun, Alhambra, CA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/698,229

(22) Filed: Mar. 18, 2022

(65) Prior Publication Data

US 2022/0214254 A1    Jul. 7, 2022

Related U.S. Application Data

(62) Division of application No. 16/513,203, filed on Jul. 16, 2019, now Pat. No. 11,415,495.

(51) Int. Cl.
| | |
|---|---|
| *G01N 1/40* | (2006.01) |
| *G01N 1/22* | (2006.01) |
| *G01N 27/622* | (2021.01) |
| *G01Q 30/02* | (2010.01) |
| *H01J 49/04* | (2006.01) |
| *G01N 30/00* | (2006.01) |

(52) U.S. Cl.
CPC ........... *G01N 1/405* (2013.01); *G01N 1/2214* (2013.01); *G01N 1/4022* (2013.01); *G01N 27/622* (2013.01); *G01Q 30/02* (2013.01); *H01J 49/0468* (2013.01); *G01N 2030/008* (2013.01)

(58) Field of Classification Search
CPC .... G01N 1/405; G01N 1/2214; G01N 1/4022; G01N 27/622; G01N 2030/008; G01N 2001/4027; G01Q 30/02; H01J 49/0468; H01J 49/0495

USPC .......... 356/440; 250/339.07, 339.08, 339.12, 250/339.13, 390.08, 288; 73/863.12, 73/61.59, 64.56, 863.11, 863.31, 863.33
See application file for complete search history.

(56) References Cited

U.S. PATENT DOCUMENTS

| | | | |
|---|---|---|---|
| 2010/0126284 A1 | 5/2010 | Boudries et al. | |
| 2012/0180576 A1 | 7/2012 | Rafferty et al. | |
| (Continued) | | | |

FOREIGN PATENT DOCUMENTS

| | | | |
|---|---|---|---|
| CN | 109308990 A | | 2/2019 |
| CN | 106645369 B | * | 4/2019 |
| (Continued) | | | |

OTHER PUBLICATIONS

Niesz, J. et al., "A Miniaturized Thermal Desorption Unit for Chemical Sensing Below Odor Threshold", Sensors and Actuators B: Chemical Elsevier BV, NL, vol. 95, No. 1-3., Oct. 15, 2003, pp. 1-5.

(Continued)

*Primary Examiner* — Robert R Raevis
(74) *Attorney, Agent, or Firm* — Locke Lord LLP; Joshua L. Jones; Scott D. Wofsy

(57) ABSTRACT

A thermal desorber assembly includes a housing and a desorption heater element mounted in the housing with a sample cavity defined between the desorption heater element and an inner wall of the housing. An outlet port is defined in the housing. A flow channel connects the sample cavity in fluid communication with the outlet port for conveying analytes from the sample cavity to the outlet port for introducing the analytes to a spectrometer.

5 Claims, 4 Drawing Sheets

(56) References Cited

U.S. PATENT DOCUMENTS

| | | |
|---|---|---|
| 2014/0117222 A1 | 5/2014 | Nguyen |
| 2015/0276559 A1 | 10/2015 | Ovchinnikova et al. |
| 2017/0016856 A1 | 1/2017 | Zhang et al. |
| 2017/0316926 A1* | 11/2017 | Arnold ................ H01J 49/0459 |
| 2018/0284081 A1 | 10/2018 | Shaw et al. |
| 2018/0372684 A1 | 12/2018 | Wu |
| 2019/0041305 A1 | 2/2019 | Bowers, II et al. |
| 2019/0204188 A1 | 7/2019 | Zhang et al. |

FOREIGN PATENT DOCUMENTS

| | | | | |
|---|---|---|---|---|
| CN | 109844901 A | * | 6/2019 | ............ G01N 1/405 |
| EP | 2884254 A1 | | 6/2015 | |
| GB | 2334101 A | | 8/1999 | |
| WO | 2017210557 A1 | | 12/2017 | |

OTHER PUBLICATIONS

Jude A. Kelley et al., "Reagent Approaches for Improved Detection of Chlorate and Perchlorate Salts Via Thermal Desorption and Ionization: Improving the Trace Detection of Chlorate and Perchlorate Salts", Rapid Communications in Mass Spectrometry, vol. 30, No. 1, Dec. 13, 2015. pp. 191-198.

Extended European Search Report dated Nov. 17, 2020, issued during the prosecution of European Patent Application No. 20181748.3.

Notice of References Cited in U.S. Appl. No. 16/513,203; dated Oct. 7, 2021.

\* cited by examiner

THERMAL DESORBERS

CROSS-REFERENCE TO RELATED APPLICATIONS

This is a divisional of U.S. patent application Ser. No. 16/513,203 filed Jul. 16, 2019, the content of which is incorporated by reference herein in its entirety.

STATEMENT REGARDING FEDERALLY SPONSORED RESEARCH OR DEVELOPMENT

This invention was made with government support under contract number HSHQDC-16-C-B0001 awarded by the Department of Homeland Security. The government has certain rights in the invention.

BACKGROUND

1. Field

The present disclosure relates to chemical detection, and more particularly to mobility spectrometry with thermal desorption of analytes.

2. Description of Related Art

Chemical detection can involve techniques used to separate and identify molecules in a sample. Applications include detection of analytes such as in security applications where detection of explosives or drugs is required. For example, a security agent in an airport security check point can swab a passenger's hands and luggage, place the swab in a spectrometer, and run the spectrometer to detect any molecules associated with explosives, drugs, or the like. The process requires transferring a sample from a surface being interrogated, e.g., a passengers hands or luggage, to the chemical detection system of the spectrometer.

The conventional techniques have been considered satisfactory for their intended purpose. However, there is an ever present need for improved systems and methods for transferring samples for analysis in chemical detector systems. This disclosure provides a solution for this need.

SUMMARY

A thermal desorber assembly includes a housing and a desorption heater element mounted in the housing with a sample cavity defined between the desorption heater element and an inner wall of the housing. An outlet port is defined in the housing. A flow channel connects the sample cavity in fluid communication with the outlet port for conveying analytes from the sample cavity to the outlet port for introducing the analytes to a spectrometer.

The desorption heater element can include a metallic resistive heater. The flow channel can be defined in the desorption heater element from a radially outward port on a lateral surface of the desorption heater element that is connected to a main flow channel portion extending in an axial direction within the desorption heater element. A second flow channel can be defined in the desorption heater element.

The housing can include a glass tube, wherein the sample cavity is defined between an outward facing surface of the desorption heater element and an inward facing surface of the glass tube. The glass tube can be annular, wherein the desorption heater element is cylindrical, and wherein the sample cavity is annular in cross-section. The glass tube can be mounted in a sheath component of the housing. A door can be mounted to the housing at a sampling end opposite an outlet port of the housing, wherein the door is configured for movement between a closed position closing the sample cavity and an open position opening the sample cavity for access to insert and remove samples from the sample cavity. The glass tube can be flush with an outward facing end surface of the housing, and the desorption heater element can be recessed relative to the end surface. The door can include a plug portion configured to enter the glass tube where the desorption heater element is recessed with the door in the closed position, and a main door portion which is configured to engage the end surface of the housing with the door in the closed position.

A gas port element can operatively connect between the fluid channel and the outlet port of the housing. A resistance temperature detector element can be mounted in the housing operatively connected to detect temperature of the desorption heater element and output feedback data for temperature control of the desorption heater element. A controller can be operatively connected to the resistance temperature detector and to the desorption heater element to maintain the desorption heater element at a constant temperature. A spectrometer can be operatively connected to the housing to receive a flow of analytes from the outlet port for detection of the analytes. The spectrometer can include a mobility spectrometer.

A method of spectrometry includes introducing a sample with analytes into an annular sample cavity. The method includes desorbing analytes out of the sample by heating a desorption heater element on an inward side of the sample cavity, conducting the analytes out of the sample cavity and into a spectrometer, and using the spectrometer to analyze the analytes to identify presence of a target analyte.

Introducing the sample can include using a swab coupon to swab surfaces of interest to pick up analytes from the surfaces of interest, and inserting the swab coupon into the sample cavity at least partially wrapping the swab coupon around the desorption heater element. The method can include closing a door to close an open end of the sample cavity after inserting the swab coupon. The method can include controlling heating of the desorption heater element to a constant, above ambient temperature. It is also contemplated that the method can include opening the door and removing the swab coupon from the sample cavity.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
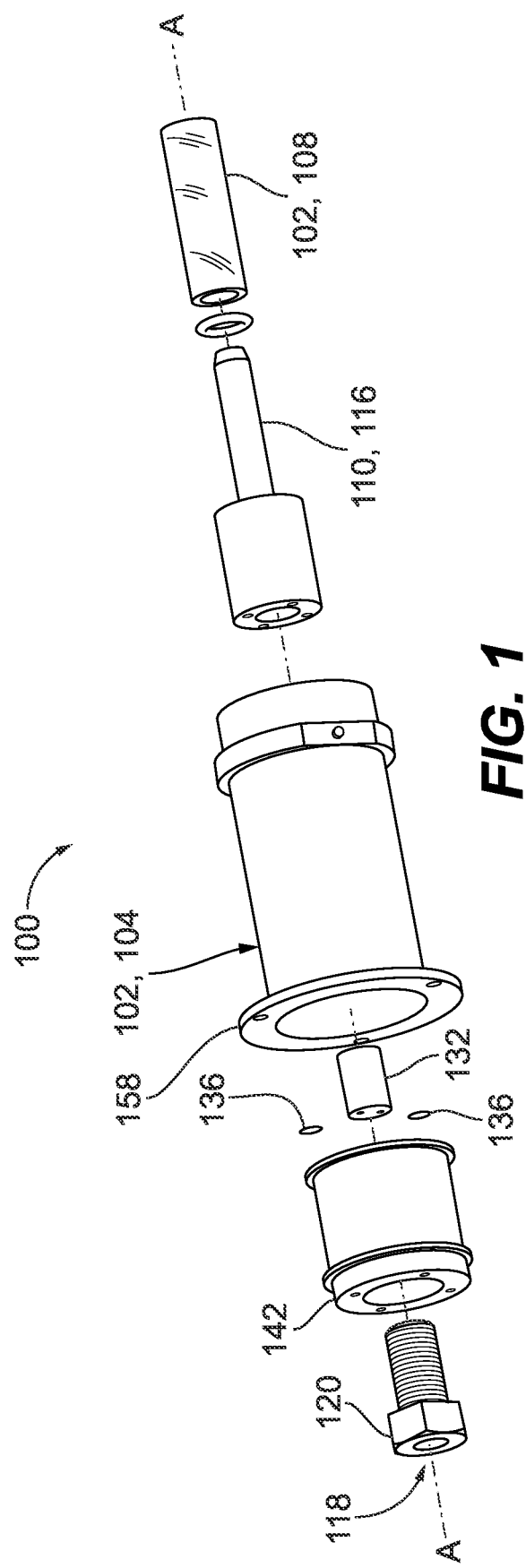
FIG. 1 is an exploded perspective view of an embodiment of a thermal desorber assembly constructed in accordance with the present disclosure, showing the housing, glass tube, and desorption heater element.

Reference will now be made to the drawings wherein like reference numerals identify similar structural features or aspects of the subject disclosure. For purposes of explanation and illustration, and not limitation, a partial view of an embodiment of a thermal desorber assembly in accordance with the disclosure is shown in FIG. 1 and is designated generally by reference character 100. Other embodiments of systems in accordance with the disclosure, or aspects thereof, are provided in FIGS. 2-6, as will be described. The systems and methods described herein can be used to desorb analytes for mobility spectroscopy, such as in a differential mobility spectrometer.

Figure 2:
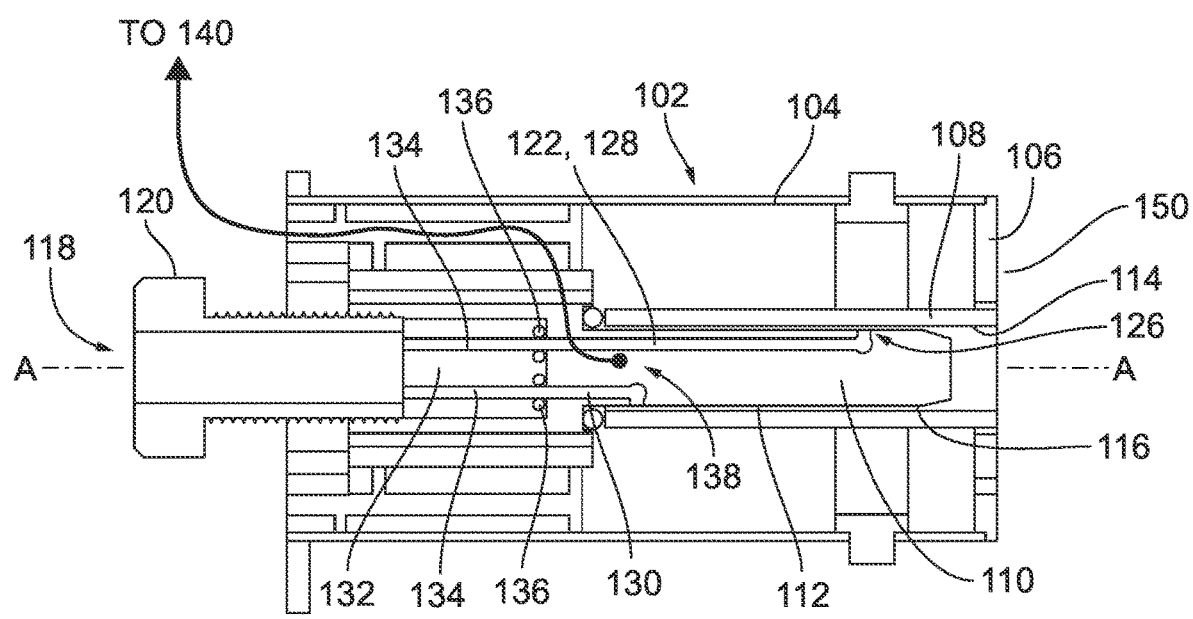
FIG. 2 is a cross-sectional side elevation view of the assembly of FIG. 1, showing the flow channels.

A thermal desorber assembly 100 includes a housing 102, including the sheath element 104, end wall 106 (labeled in FIG. 2), and tube 108. A desorption heater element 110 is mounted in the housing 102, as shown in FIG. 2, with a sample cavity 112 defined between the desorption heater element 110 and an inner wall of the housing 102, specifically between the inward facing surface 114 of the tube 108 and the outward facing surface 116 of the desorption heater element 110. An outlet port 118 is defined in the housing 102 in the form of a passage through a threaded lug 120. A first flow channel 122 connects the sample cavity 112 in fluid communication with the outlet port 118 for conveying gas borne analytes from the sample cavity 112 to the outlet port 118 for introducing the analytes to a spectrometer 156, shown in FIG. 3. The flow channel 122 is defined in the desorption heater element 110 from a radially outward port 126 on a lateral, outward facing surface 116 of the desorption heater element 110 that is connected to a main flow channel portion 128 extending in an axial direction relative to axis A within the desorption heater element 110. A second flow channel 130, similar to the first flow channel 122 but shorter, is defined in the desorption heater element 110. Those skilled in the art will readily appreciate that any suitable number of flow channels can be used without departing from the scope of this disclosure. A gas port element 132, including a passage 134 for each respective flow channel 122, 130 connects between the fluid channels 122, 130 and the outlet port 118 of the housing 102 for fluid communication of gas conveying the analytes therethrough. O-rings 136 provide sealing between the flow channels 122, 130 and the passages 134 to reduce or possibly eliminate gas flowing out of the intended flow path.

The desorption heater element 110 includes or forms a metallic resistive heater. A resistance temperature detector element 138 is mounted in the housing, in thermal contact with the desorption heater element 110 to detect temperature of the desorption heater element 110 and to output feedback data to a controller 140, which is operatively connected to the detector element 138 and to the desorption heater element 110 to control temperature to maintain the desorption heater element 110 at a constant temperature.

The tube 108 can be comprised of borosilicate glass or any other suitable material with thermal insulative properties. The tube 108 is annular and since the desorption heater element 110 is cylindrical, the sample cavity 112 therebetween is annular in cross-section. The sheath element 104 can be comprised of any suitable material. A spacer 142 supports the desorption heater element 110 from the sheath element, cantilevering the desorption heater element 110 within the sample cavity 112.

Figure 3:
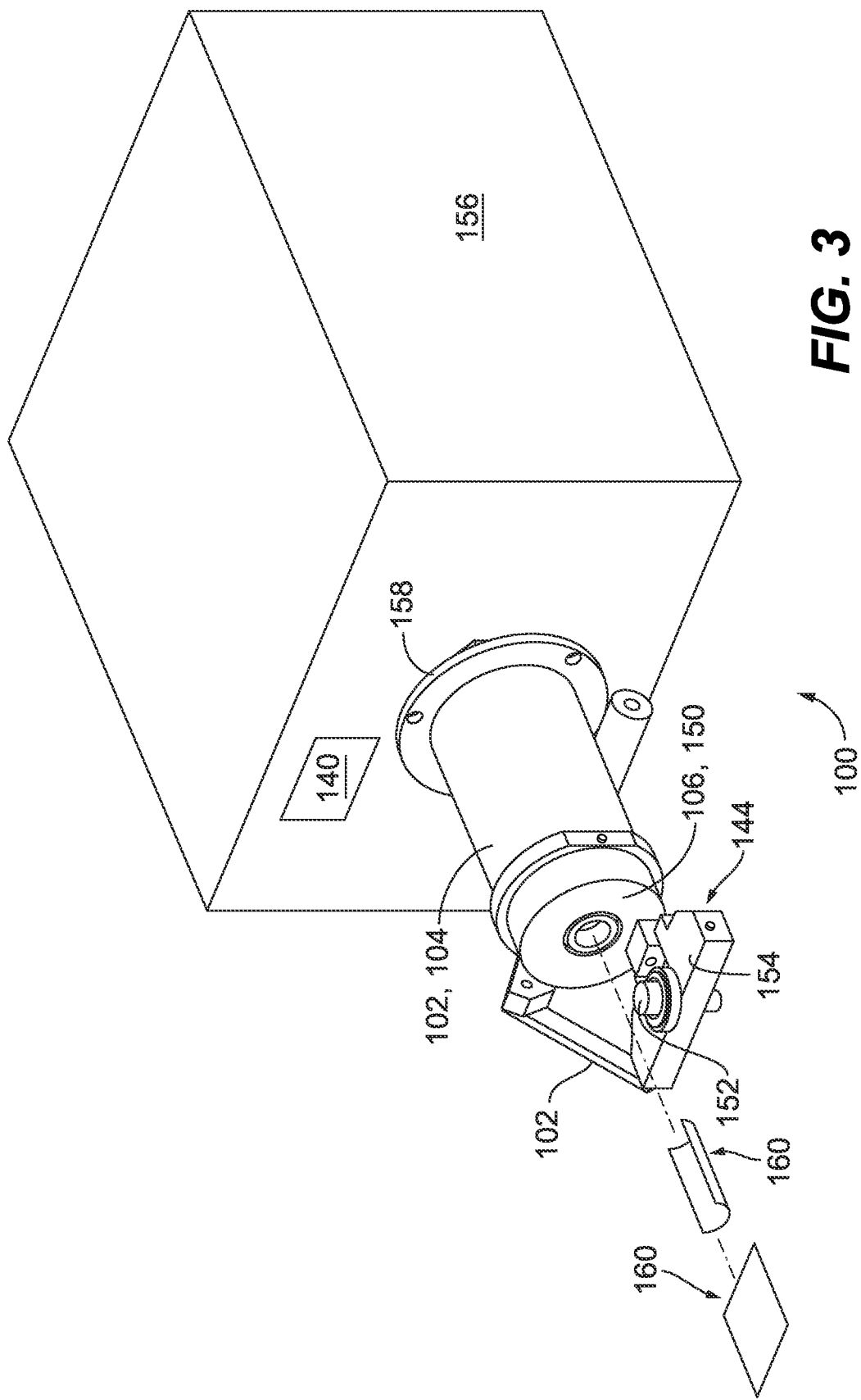
FIG. 3 is a perspective view of the assembly of FIG. 1, showing the spectrometer mounted to the assembly.
Figure 6:
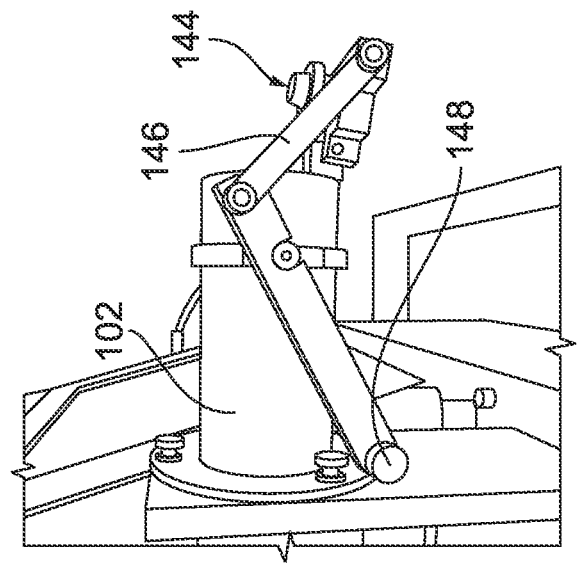
FIG. 6 is a perspective view of the assembly of FIG. 1, showing the door in the closed position.
Figure 5:
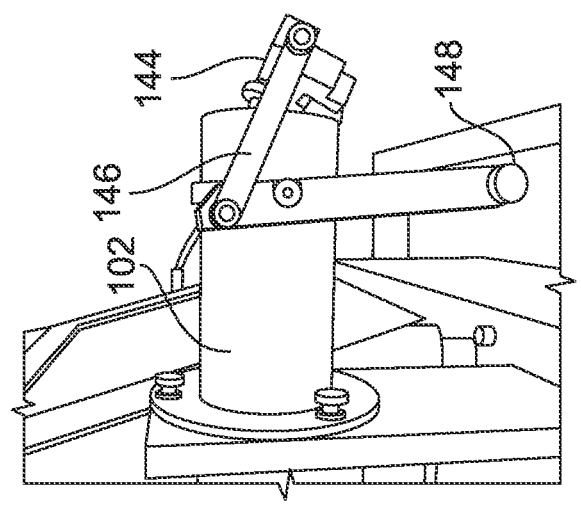
FIG. 5 is a perspective view of the assembly of FIG. 1, showing the door between the open and closed positions.
Figure 4:
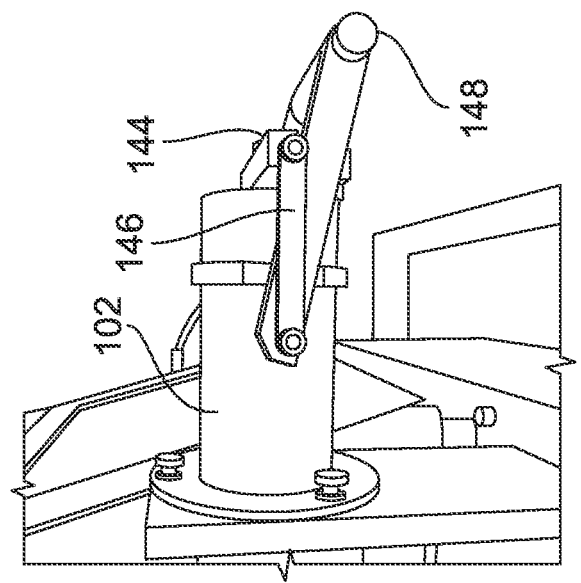
FIG. 4 is a perspective view of the assembly of FIG. 1, showing the door in the open position.

With reference now to FIG. 3, a door 144 is mounted by a mechanism 146 to the housing 102 at a sampling end opposite an outlet port 118 (shown in FIGS. 1 and 2). The door 144 is configured for movement between a closed position, shown in FIG. 4, which closes off the sample cavity 112 (labeled in FIG. 2) and an open position, shown in FIG. 6, opening the sample cavity 112 for access to insert and remove samples from the sample cavity. FIG. 5 shows the door 144 between the open and closed positions, and FIGS. 4-6 show the movement of the mechanism 146, which can be any suitable mechanism. The mechanism 146 converts motion of the handle 148 to actuate the door 144.

With continued reference to FIGS. 2 and 3, the tube 108 is flush with an outward facing end surface 150 of the housing 102, and the desorption heater element 110 is recessed relative to the end surface 150, helping prevent a user touching the desorption heater element 110 and getting burned. The door 144 includes a plug portion 152 configured to enter the end of the tube 108 where the desorption heater element 110 is recessed when the door 144 is in the closed position. The door 144 also includes a main door portion 154 which is configured to engage the end surface 150 of the housing 120 when the door 150 is in the closed position.

With reference now to FIG. 3, a spectrometer 156 is operatively connected to the housing 102 by flange 158 being fastened to the spectrometer 156 so the spectrometer 156 can receive a flow of analytes from the outlet port 118 (labeled in FIG. 2) for detection of the analytes. The spectrometer 156 can include an ion-mobility spectrometer.

A method of spectrometry includes introducing a sample with analytes into an annular sample cavity, e.g., the sample cavity 112 labeled in FIG. 2. Introducing the sample can include using a swab coupon 160 to swab surfaces of interest, e.g. the surfaces of a passenger's hands and luggage handles, to pick up analytes from the surfaces of interest. As indicated by the sequence arrows in FIG. 3, a user can curl the swab coupon 160 and insert the swab coupon 160 into the sample cavity 112 partially or completely wrapping the swab coupon 160 around the desorption heater element 110. The leading edge of the desorption heater element 110 is not only recessed, it is tapered to facilitate insertion of the swab coupon 160. The sample cavity 112 can be small in volume to reduce air that would otherwise dilute the sample. With the swab coupon 160 inside the sample cavity, the user can close the door 144 to close the open end of the sample cavity 112.

With the swab coupon 160 enclosed in the sample cavity, the method includes desorbing analytes out of the sample by heating the desorption heater element 110 (labeled in FIG. 2), which accelerates entrainment of analytes from the swab coupon 160 into a flow of gas through the flow channels 122, 130 (labeled in FIG. 2), to conduct the analytes out of the sample cavity 112 and into a spectrometer 156. All of the flow passage surfaces can be temperature controlled to reduce or prevent condensation of analytes on the surfaces. The user can then use the spectrometer 156 to analyze the analytes to identify presence of a target analyte, e.g., a chemical of interest such as chemicals associated with explosives or controlled substances. The user can use the assembly 100 to heat the analytes wherein the controller 140 automatically controls heating of the desorption heater element 110 to maintain a constant temperature, above ambient temperature of the desorption heater element 110, but, e.g., below 40° C. (104° F.) to avoid pyrolizing the swab coupon 160 for example. After heating the analytes, the user can open the door 144 and remove the swab coupon 160 from the sample cavity 112, which is then ready for receipt of the next swab coupon 160.

The methods and systems of the present disclosure, as described above and shown in the drawings, provide for thermal desorption of analytes from samples for ion-mobility spectroscopy to improve spectrometry signal to noise ratio and testing time. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of spectrometry comprising:
   introducing a sample with analytes into an annular sample cavity;
   desorbing analytes out of the sample by heating a desorption heater element on an inward side of the sample cavity;
   conducting the analytes out of the sample cavity and into a spectrometer; and
   using the spectrometer to analyze the analytes to identify presence of a target analyte.

2. The method as recited in claim 1, wherein introducing the sample includes:
   using a swab coupon to swab surfaces of interest to pick up analytes from the surfaces of interest; and
   inserting the swab coupon into the sample cavity at least partially wrapping the swab coupon around the desorption heater element.

3. The method as recited in claim 2, further comprising closing a door to close an open end of the sample cavity after inserting the swab coupon.

4. The method as recited in claim 3, further comprising controlling heating of the desorption heater element to a constant, above ambient temperature.

5. The method as recited in claim 4, further comprising opening the door and removing the swab coupon from the sample cavity.

* * * * *